United States Patent [19]

Miyake et al.

[11] Patent Number: 4,548,628
[45] Date of Patent: Oct. 22, 1985

[54] FILTER MEDIUM AND PROCESS FOR PREPARING SAME

[75] Inventors: Masaaki Miyake, Ibaraki; Kunihiko Fukumori, Takatsuki, both of Japan

[73] Assignee: Asahi Kasei Kogyo Kabushiki Kaisha, Japan

[21] Appl. No.: 483,253

[22] Filed: Apr. 8, 1983

[30] Foreign Application Priority Data

Apr. 26, 1982 [JP] Japan .................... 57-68812
Jul. 9, 1982 [JP] Japan .................... 57-118635
Jul. 9, 1982 [JP] Japan .................... 57-118636

[51] Int. Cl.$^4$ ............................................. B01D 46/00
[52] U.S. Cl. .................................. 55/487; 55/528; 28/104
[58] Field of Search ................... 55/486–488, 55/522, 524, 527, 528, 521, DIG. 5, DIG. 9; 28/104; 428/299, 903; 210/505

[56] References Cited

U.S. PATENT DOCUMENTS

| | | | |
|---|---|---|---|
| 2,708,982 | 5/1955 | McGuff et al. | 55/528 |
| 3,573,158 | 3/1971 | Pall et al. | 210/505 |
| 4,011,067 | 3/1977 | Carey | 55/528 |
| 4,093,437 | 6/1978 | Ichihara et al. | 55/487 |
| 4,152,480 | 5/1979 | Adachi et al. | 428/227 |
| 4,164,400 | 8/1979 | Wald | 55/528 |
| 4,179,274 | 12/1979 | Moon | 55/524 |

FOREIGN PATENT DOCUMENTS

| | | | |
|---|---|---|---|
| 12666 | 5/1979 | Japan | 55/528 |
| 9575 | 3/1981 | Japan | 55/528 |

*Primary Examiner*—Bernard Nozick
*Attorney, Agent, or Firm*—Berman, Aisenberg & Platt

[57] ABSTRACT

A filter medium comprising one fibrous web or a plurality of piled and integrated fibrous webs is provided. The web or webs are composed mainly of ultra-fine combustible synthetic fibers having a single fiber diameter of 0.1 to 1.5μ. The constituent fibers in each web are entangled with one another in various directions and satisfy the following requirements:

(i) the fiber packing ratio α (%), defined by the formula: $\alpha = (\rho'/\rho) \times 100$ ($\rho$ = true density of the fibers, $\rho'$ = apparent density of the filter medium), is in the range of $20 \geq \alpha \geq 3$, (ii) the ratio $S_B/S_A$ of the actually measured surface area $S_B$(m$^2$) of the fibers per m$^2$ of the filter medium to the total surface area $S_A$(m$^2$) expressed by the formula: $S_A = (9000\pi\phi w)/d$ (d mean single fiber denier, $\phi$ the means single fiber diameter (m) and W basis weight (g/m$^2$) of the filter medium) is in the range of $$1 > S_B/S_A \geq 0.6, \text{ and}$$

(iii) the number N of single fibers piled in the thickness direction of the filter medium, expressed by the formula: $N = \pi l/100\phi$ ($\alpha$ = fiber packing ratio (%), l = thickness (μ) of the filter medium and $\phi$ = mean single fiber diameter (μ)) is in the range of $1000 \geq N \geq 40$. The filter medium is prepared by jetting high-pressure water to at least one surface of the fibrous web or webs, after or without a heat treatment thereof, from nozzles having a diameter of 0.05 to 0.5 mm and making a circular or reciprocating movement in parallel to the fibrous web or webs while moving the fibrous web or webs.

6 Claims, No Drawings

FILTER MEDIUM AND PROCESS FOR PREPARING SAME

BACKGROUND OF THE INVENTION (1) Field of the Invention

This invention relates to a filter medium comprising one fibrous web or a plurality of piled and integrated webs, which are comprised of ultra-fine combustible synthetic fibers three-dimensionally interlaced and entangled in various directions. This filter medium is excellent in filtering efficiency, has a long life and a high tenacity and can be burnt, and is particularly useful as an air filter. The present invention also relates to a process for preparing this filter medium.

(2) Description of the Prior Art

A high-efficiency air filter for use in filtering and purifying air containing radioactive dusts in a room in an atomic power plant or atomic power research institute where radioactive substances are handled and discharging purified air from the room, or a high-efficiency air filter for use in filtering and purifying exterior air and introducing purified air into a clean room in a hospital, a precision machine-assembling plant or a semiconductor-preparing plant, is required to collect ultra-fine dusts having a size smaller than $1\mu$ at a high efficiency.

High-efficiency air filters heretofore used for the above-mentioned purposes comprise as a filter medium a non-woven fabric obtained from cut fibers of fine glass filaments according to the paper-making method. There has not been known a high-efficiency air filter comprising a filter medium composed of fibers other than glass fibers.

A high-efficiency air filter to be used for the above-mentioned purposes is required to have such a property that 99.0% or more of ultra-fine particles having a size of $0.3\mu$ be collected at a small air permeation resistance, such as less than 50 mmH$_2$O as measured at an air speed of 2.3 cm/sec. This requirement has not been satisfied by any air filters other than a high-efficiency air filter comprising a filter medium formed from ultra-fine glass fibers according to the paper-making method.

In this filter medium formed from glass fibers according to the paper-making method, however, since the constituent fibers are arranged only two-dimensionally, collection of ultra-fine dusts can be done only on the surface of the filter medium, and therefore, it is very difficult to increase the amount collected of dusts. Furthermore, because of a low tenacity due to the brittleness of glass fibers, the filter medium is readily broken during the handling or use. Moreover, since glass fibers are incombustible, disposal of the filter medium by burning is impossible, and the glass fiber filter medium involves a serious problem, that is, how to discard the used filter.

Since a used high-efficiency air filter containing radioactive dusts cannot simply be discarded, it is packed and sealed in a vessel such as a drum can, as it is or after compression and is stored in this state, and it is a problem how to maintain a place for the storage of these packed vessels.

Accordingly, it has eagerly been desired to develop a filter medium valuable for a combustible high-efficiency air filter which is not broken during the handling or use, has an efficiency of collecting ultra-fine dusts, has a long life and can be burnt.

SUMMARY OF THE INVENTION

It is a primary object of the present invention to provide a filter medium which is valuable particularly as a high-efficiency air filter and which is excellent in the filtering efficiency, has a long life and a high tenacity and can be burnt.

More specifically, in accordance with one fundamental aspect of the present invention, there is provided a filter medium comprising one fibrous web or a plurality of piled and integrated fibrous webs, said web or webs being composed mainly of ultra-fine combustible synthetic fibers having a single fiber diameter of 0.1 to $1.5\mu$, wherein the constituent fibers are interlaced and entangled with one another in various directions and satisfy the following requirements:

(i) the fiber packing ratio $\alpha(\%)$, which is defined by the following formula, is in the range of $20 \geq \alpha \geq 3$:

$$\alpha = \frac{\rho'}{\rho} \times 100$$

wherein $\rho$ stands for the true density of the fibers and $\rho'$ stands for the apparent density of the filter medium, (ii) the ratio $S_B/S_A$ of the actually measured surface area $S_B$ (m$^2$) of the constituent fibers per m$^2$ of the filter medium to the total surface area $S_A$ (m$^2$) expressed by the following formula:

$$S_A = \frac{9000\pi\phi W}{d}$$

wherein d stands for the mean single fiber denier, $\phi$ stands for the mean single fiber diameter (m) and W stands for the basis weight (g/m$^2$) of the filter medium, is in the range of $$1 > \frac{S_B}{S_A} \geq 0.6, \text{ and}$$

(iii) the number N of single fibers piled in the thickness direction of the filter medium, which is expressed by the following formula:

$$N = \frac{\alpha l}{100\phi'}$$

wherein $\alpha$ stands for the fiber packing ratio (%), l stands for the thickness ($\mu$) of the filter medium and $\phi'$ stands for the mean single fiber diameter ($\mu$), is in the range of $1000 \geq N \geq 40$.

In one preferred embodiment of the filter medium having the above-mentioned structure, the filter medium has a three-layer structure comprising a front layer in which the constituent fibers are interlaced and entangled mainly three-dimensionally and which has fine fluffs formed on the surface thereof, an intermediate layer in which the constituent fibers are interlaced and entangled mainly two-dimensionally and a back layer in which the constituent fibers are interlaced and entangled mainly three-dimensionally and which is denser than the front layer.

In another preferred embodiment of the filter medium having the above-mentioned structure, at least one surface of the filter medium is entirely covered with irregular fine depressions not uniform in shape, which have a mean diameter of 0.05 to 2 mm and a mean depth of 0.05 to 0.5 mm.

In accordance with another fundamental aspect of the present invention, there is provided a process for the preparation of a filter medium, which comprises jetting high-pressure water to at least one surface of a fibrous web or a plurality of piled fibrous webs, after or without a heat treatment thereof, from nozzles having a diameter of 0.05 to 0.5 mm and making a circular or reciprocating movement in parallel to the fibrous web or webs while moving the fibrous web or webs, said web or webs being composed mainly of ultra-fine combustible synthetic fibers having a single fiber diameter of 0.1 to 1.5μ, drying the jet-treated fibrous web or webs, and, if necessary, heat-setting the fibrous web or webs.

In one preferred embodiment of the above-mentioned process, the high-pressure water jet treatment is conducted on each of the front and back layers of the fibrous web or webs at least once, the frequency of the high-pressure water jet treatment on the front layer is higher than the frequency of the high-pressure water jet treatment on the back layer, and the jet pressure is highest at the first jet treatment and is then gradually reduced.

In another preferred embodiment of the above-mentioned process, a net member is interposed between the fibrous web or webs and the water jet nozzles at the high-pressure water jet treatment to finely disperse high-pressure water.

DESCRIPTION OF THE PREFERRED EMBODIMENTS

The web referred to in the present invention is a web formed of a non-woven fabric of filaments obtained by melt spinning. A web of filaments obtained according to the melt blow spinning method is especially preferred. According to the melt blow spinning method, ultra-fine fibers suitable for attaining the objects of the present invention are readily obtained, and a web which is uniform in the basis weight and thickness and in which pinholes are hardly formed can easily be obtained.

It is indispensable that this web be composed mainly of ultra-fine combustible synthetic fibers having a single fiber diameter of 0.1 to 1.5μ, preferably 0.2 to 1.3μ. By the term "combustible synthetic fiber" are meant an easily combustible synthetic fiber and a flame-retardant synthetic fiber. In other words, not only a flammable synthetic fiber but also a synthetic fiber that can be burnt if exposed to a high temperature can be used. When an easily flammable synthetic fiber is used, in order to prevent occurrence of a fire accident during the use it is preferred that the synthetic fiber be subjected to a flame-retardant treatment. Of course, this flame-retardant treatment should not be one that will degrade the efficiency of the filter medium of the present invention.

As the ultra-fine combustible synthetic fibers, there are preferably used thermoplastic synthetic fibers such as polyester fibers, polyamide fibers, polyolefin fibers and polyacrylic fibers. From the viewpoint of the dimensional stability, polyester fibers are especially preferred.

In a filter medium in which the main ultra-fine constituent fibers have a single fiber diameter smaller than 0.1μ, since the single fibers are brought into closer contact with each other, the fiber packing ratio becomes too high, and therefore, the initial air permeation resistance is undesirably increased though collection of ultra-fine dusts becomes ensured. In contrast, in a filter medium composed mainly of fibers having a single fiber diameter larger than 1.5μ, the fiber packing ratio is too low and it is difficult to collect ultra-fine dusts at a high efficiency.

In the present invention, it is especially preferred that the single fiber diameter of the main constituent combustible synthetic fibers be in the range of from 0.2 to 1.3μ.

A web composed mainly of ultra-fine combustible synthetic fibers having a single fiber diameter of 0.1 to 1.5μ is used alone or a plurality of such webs are piled and used in the piled form. The web or webs is integrated to interlace and entangle respective constituent fibers with one another, whereby a filter medium is constructed. In this filter medium, all of the constituent fibers may be ultra-fine combustible synthetic fibers of the same kind having a single fiber diameter of 0.1 to 1.5μ, or fibers of a different kind may be mixed into these ultra-fine combustible synthetic fibers. Especially, it is preferred that the ultra-fine combustible synthetic fibers be mixed with not more than 30%, particularly not more than 20%, of fibers of the same or different kind having a single fiber diameter 2 to 10 times as large as the maximum single fiber diameter of the ultra-fine combustible synthetic fibers. These thick fibers exert a reinforcing action, and they prevent very fine single fibers from being brought into closer contact with each other and are effective for inhibiting abrupt increase of the air permeation resistance.

In the present invention, it is important that this filter medium should satisfy the following requirements.

In the first place, the fiber packing ratio $\alpha$ (%) defined by the following formula:

$$\alpha = \frac{\rho'}{\rho} \times 100$$

wherein $\rho$ stands for the true density of the fibers and $\rho'$ stands for the apparent density of the filter medium, should be in the range of $20 \geq \alpha \geq 3$.

If the fiber packing ratio is less than 3%, collection of ultra-fine dusts cannot assuredly be performed, and the intended filter medium valuable for a high-efficiency air filter cannot be obtained. If the fiber packing ratio is more than 20%, the air permeation resistance is increased and clogging is caused, and therefore, the life of the filter medium is shortened and the filter medium is not suitable for a high-efficiency air filter. In the present invention, it is especially preferred that the fiber packing ratio be in the range of from 4 to 18%.

In the second place, it is indispensable that the ratio $S_B/S_A$ of the actually measured surface area $S_B$ (m²) of the constituent fibers per m² of the filter medium to the theoretical surface area $S_A$ (m²), which is expressed by the following formula:

$$S_A = \frac{9000\pi\phi W}{d}$$

wherein d stands for the mean denier of the single fibers constituting the filter medium, $\phi$ stands for the mean diameter (m) of the fibers and W stands for the basis weight (g/m²) of the filter medium, should be in the range of $$1 > \frac{S_B}{S_A} \geqq 0.6.$$

The theoretical surface area $S_A$ (m$^2$) is a total surface area of the constituent fibers calculated from the denier and diameter of the constituent fibers and the basis weight of the filter medium. The actually measured surface area $S_B$ (m$^2$) is an actually measured surface area of the constituent fibers obtained by determining a specific surface area by using a specific surface area measuring apparatus of the type where calculation is made from the amount of adsorbed molecules of a gas such as nitrogen or argon and converting the obtained value to a value per m$^2$ of the filter medium.

In the present invention, this surface area ratio $S_B/S_A$ indicates the degree of bundling or close contact of the constituent fibers of the filter medium. It is necessary that this value should be at least 0.6, preferably at least 0.7. If the fiber surface area ratio is less than 0.6, many thicker fibers (rope-like bundled fibers) are formed because of mutual close contact of the respective fibers with each other, and therefore, the efficiency of collecting ultra-fine dusts is considerably reduced. These rope-like bundled fibers can be observed even with the naked eye, and if the fiber surface area ratio is less than 0.6, formation of rope-like bundled fibers becomes conspicuous. Since ultra-fine fibers having a single fiber diameter smaller than 0.5μ have a very strong cohesive force, in these ultra-fine fibers, the risk of formation of rope-like bundled fibers by mutual close contact is especially high. Accordingly, in the present invention, rope-like bundled fibers formed by mutual close contact of ultra-fine fibers are dispersed substantially to individual fibers, whereby the fiber surface area ratio is maintained at a level of at least 0.6. For this purpose, a fibrous web or a plurality of piled webs, which is or are composed of ultra-fine fibers and prepared by the melt blow spinning method, is or are subjected to a high-pressure fluid treatment. By this treatment, the entanglement of fibers with one another is enhanced.

In the third place, the number N of the single fibers piled in the thickness direction of the filter medium, which is expressed by the following formula:

$$N = \alpha l / 100 \phi'$$

wherein $\alpha$ stands for the fiber packing ratio (%), l stands for the thickness (μ) of the filter medium and $\phi'$ stands for the mean diameter (μ) of the single fibers, should be in the range of $1000 \geqq N \geqq 40$. If the number N is smaller than 40, the fiber packing ratio of the filter medium is too low and it is difficult to obtain fine dusts at a high efficiency, and therefore, an intended filter medium valuable for a high-efficiency air filter cannot be provided. If the number N exceeds 1000, the fiber packing ratio becomes too high and the air permeation resistance is increased.

Incidentally, the mean single fiber diameter referred to in the present invention is a mean value calculated from measured diameters of optionally selected 100 fibers in a photograph of 20,000 magnifications taken by a scanning type electron microscope, and the mean single fiber denier is a value obtained by multiplying this diameter by the specific gravity of the fibers.

The filter medium of the present invention is prepared by jetting high-pressure water to at least one surface of a fibrous web or a plurality of piled fibrous webs, after or without a heat treatment thereof, from nozzles having a diameter of 0.05 to 0.5 mm and making a circular or reciprocating movement in parallel to the fibrous web or webs while moving the fibrous web or webs, said web or webs having a basis weight of 30 to 500 g/m$^2$ and being composed mainly of ultra-fine combustible synthetic fibers having a single fiber diameter of 0.1 to 1.5μ, drying the water jet-treated fibrous web or webs, and, if necessary, heat-setting the fibrous web or webs.

The fibrous web or webs to be used for the production of the filter medium of the present invention may or may not be heat-treated in advance. In the case where the heat treatment is not carried out in advance, the heat treatment may be conducted at the final step. In the case where the heat treatment is carried out in advance, it is sufficient if drying is performed at the final step. This heat treatment is carried out mainly for improving the morphological stability, and the heat treatment is conducted at a temperature in the range of from 100° C. to the melting point of the fibers, preferably at a temperature of from 120° to 180° C.

In a preferred embodiment of the process of the present invention, high-pressure water is jetted to the surface of the fibrous web or webs in a vacuum zone while delivering the fibrous web or webs placed on a net, whereby individual fibers are entangled with one another. For this water jet treatment, high-pressure water is jetted under a water pressure of 2 to 35 kg/cm$^2$ (gauge pressure) from a number of arranged nozzles having a diameter of 0.05 to 0.5 mm, preferably 0.1 to 0.3 mm. If the nozzle diameter is larger than 0.5 mm, no sufficient entanglement of the fibers can be attained. Accordingly, the fiber packing ratio does not fall within the range claimed in the present invention. Moreover, dispersion of rope-like bundled fibers is insufficient, and a fiber surface area ratio of at least 0.6 cannot be attained. If the nozzle diameter is smaller than 0.05 mm, the force of water is too strong and pinholes are readily formed in the fibrous web or webs, and the intended high-efficiency filter medium cannot be obtained.

If the water pressure adopted for the water jet treatment of the fibrous web or webs is lower than 2 kg/cm$^2$, the force of water is too weak and the individual fibers are not sufficiently entangled with one another, and the fiber packing ratio and fiber surface area ratio are outside the ranges claimed in the present invention. If the water pressure is higher than 35 kg/cm$^2$, the force of water is too strong and there is a risk of pinhole formation in the fibrous web or webs. Even when the water pressure is in the range of from 20 to 35 kg/cm$^2$, if the water jet treatment is conducted many times, the fiber packing ratio becomes too high and it often happens that a high-efficiency filter medium cannot be obtained. The suitable frequency of the water jet treatment depends on the water pressure and the thickness of the fibrous web or webs, but it is ordinarily preferred that the water jet treatment be conducted 1 to 5 times.

The nozzles for jetting high-pressure water to the fibrous web or webs makes a circular or reciprocating movement in parallel to the fibrous web or webs. The moving speed of the nozzles is appropriately selected relatively to the moving speed of the fibrous web or webs, and it is ordinarily preferred that the nozzles be moved at 100 to 300 rotations or oscillations per minute. Furthermore, it is preferred that the diameter of the circular movement or the amplitude of the reciprocating movement by larger than the interval between the adjacent nozzles. For example, if the interval between the adjacent nozzles is 3 to 10 mm, the diameter of the circular movement or the amplitude of the reciprocating movement is preferably 5 to 12 mm. It is preferred that the space between the fibrous web or webs and the nozzles be 2 to 8 cm. If this space is smaller than 2 cm, it is apprehended that the fibrous web or webs will be damaged by high-pressure water. In contrast, if this space is larger than 8 cm, the force of water is weak and the dispersion of fibers is reduced.

The surface of the filter medium of the present invention obtained according to the above-mentioned method is covered with irregular fine depressions that can be observed with the naked eye. Accordingly, the surface area of the filter medium is remarkably increased, and hence, the amount of dusts collected is increased and the filter life is markedly improved. Moreover, the air permeation resistance can be reduced as compared at the same flow rate.

In the above-mentioned process for the production of a filter medium according to the present invention, each of the front and back surfaces of the fibrous web or webs is subjected to the high-pressure water jet treatment at least one time. If the frequency of the high-pressure water jet treatment on the front surface is higher than the frequency of the high-pressure water jet treatment on the back surface and the jet pressure is highest at the first jetting treatment and is then gradually reduced and if the minimum pressure is not lower than 2 kg/cm$^2$, there can be obtained a filter medium having a three-layer structure described below.

More specifically, in the surface portion of the filter medium, fibers parallel to the surface of the filter medium and fibers vertical to the surface of the filter medium are three-dimensionally interlaced and entangled with one another to form an integrated front layer. However, this three-dimensional entanglement does not extend to the inner portion of the filter medium. The surface of this front layer is covered with fine fluffs composed of the constituent fibers, and the front layer has a low density and is coarse. These fluffs may be either cut fluffs or loopy fluffs. The length of the fluffs is shorter than several millimeters, and it is preferred that the majority of the fluffs have a length smaller than 1 mm. The front layer consists of the surface covered with these fluffs and the fiber layer three-dimensionally interlaced with this fluff-covered surface. It is preferred that the thickness of this front layer be about 1/5 to about ⅓ of the total thickness of the filter medium, though this condition is not particularly critical.

In the intermediate layer located below the front layer, the constituent fibers are interlaced and entangled with one another mainly two-dimensionally. In other words, the constituent fibers of the intermediate layer are interlaced and entangled with one another mainly in one plane in many directions. It is preferred that the thickness of the intermediate layer be 1/10 to ⅓ of the entire thickness of the filter medium, though this condition is not particularly critical. The boundary between the front layer and the intermediate layer need not particularly be definite, and ordinarily, the front layer is gradually merged to the intermediate layer.

Below the intermediate layer, there is a back layer in which the constituent fibers are interlaced and entangled with one another mainly three-dimensionally and which is denser than the front layer. Fluffs as observed on the surface of the front layer are hardly present on the back layer, and the constituent fibers are mutually packed with one another. It is preferred that the thickness of the back layer be 1/10 to ⅓ of the entire thickness of the filter medium, though this condition is not particularly critical. The boundary between the intermediate layer and the back layer need not particularly be definite, and ordinarily, the intermediate layer is gradually merged to the back layer.

When high-pressure water is jetted to the fibrous web or webs in the above-mentioned process for the preparation of a filter medium, if a net member is interposed between the fibrous web or webs and the nozzles to finely disperse high-pressure water and finely dispersed high-pressure water is then jetted to the fibrous web or webs, there can be obtained a filter medium having the surface covered with very fine depressions. This net member is located in an intermediate position separate from both the nozzles and the fibrous web or webs. It is preferred that the net member be located 1 to 3 cm above the surface of the fibrous web or webs and 1 to 4 cm below the nozzles. High-pressure water jetted from the nozzles making a circular or reciprocating movement impinges against wires of the net member and is finely dispersed. As the net member, there can be mentioned a metal net, a synthetic resin net and a synthetic monofilament net. Among these net members, a 50 to 200 mesh net of stainless steel or other metal wires having a diameter of 0.1 to 1 mm, which is not deformed or corroded by high-pressure water and has a good dimensional stability, is especially preferred.

It is preferred that the treatment of jetting finely dispersed high-pressure water to the fibrous web or webs be conducted on at least one surface of the fibrous web or webs at least one time. Furthermore, it is especially preferred that before the treatment of jetting high-pressure water highly dispersed by the net member, the jet treatment directly with high-pressure water from the nozzles, that is, high-pressure water not finely dispersed, be conducted on at least one surface of the fibrous web or webs at least one time. By this preliminary jet treatment, rope-like bundled fibers in the firous web or webs are dispersed and entanglement of single fibers is enhanced, and therefore, the effect of the subsequent jet treatment with highly dispersed high-pressure water is advantageously increased.

At least one surface of the so-obtained filter medium is entirely covered with fine depressions not uniform in the shape, which have a mean diameter of 0.05 to 2 mm and a mean depth of 0.05 to 0.5 mm. The sectional shape of the depressions, cut in parallel to the surface of the filter medium, is not limited to a truly circular shape, and many depressions having a non-circular section are usually included. Furthermore, these depressions are different in the depth. Accordingly, the mean diameter of each depression is an arithmetic mean of the maximum diameter and the minimum diameter. This mean diameter is in the range of from 0.05 to 2 mm, preferably from 0.1 to 1 mm. However, if the mean diameter is outside this range, this does not always result in decrease of the intended effect of increasing the dust-collecting efficiency and prolonging the life of the filter medium by remarkably increasing the surface area of the filter medium.

Furthermore, all of the depressions need not have a mean diameter falling within the above-mentioned range, but several % of depressions may have a mean diameter outside the range of from 0.05 to 2 mm. However, if the proportion of depressions having a mean diameter larger than 2 mm is excessively increased, the surface area of the filter medium is reduced and it is apprehended that the intended object of the present invention will hardly be attained. Increase of the proportion of depressions having a mean diameter smaller than 0.05 mm is not also preferred for the same reason as described above.

The mean depth of depressions is an arithmetic mean of the maximum depth and the minimum depth. This mean depth is 0.05 to 0.5 mm, preferably 0.1 to 0.3 mm. In case of a filter medium having a thickness of 1 mm or less, if the mean depth of the depressions is larger than 0.5 mm, the depressions formed resemble pinholes and have a poor dust-collecting efficiency. If the mean depth is smaller than 0.05 mm, the surface area of the filter medium is reduced.

The mean diameter and mean depth of the fine depressions, referred to herein, are values determined by lightly rubbing the surface of a filter medium with a carbon paper and observing the colored top ends of depressions by a stereoscopic microscope at 10 magnifications.

Since the filter medium of the present invention has the above-mentioned specific structure composed of ultra-fine combustible synthetic fibers, it possesses high filtration efficiency and low air permeation resistance characteristics required for high-efficiency air filters. Moreover, since the filter medium of the present invention has a very high tenacity, it is not damaged during the handling or use. In contrast to the fact that dusts are collected mainly by the surface filtration in the conventional filter media, even the interior portion exerts a dust-collecting efficiency in the filter medium of the present invention, and therefore, the amount of dusts collected is increased and the life is prolonged in the filter medium of the present invention.

In connection with disposal of the used filter medium, the filter medium of the present invention is advantageous. More specifically, although the conventional filter media cannot be burnt, the filter medium of the present invention can be burnt with no substantial residue being left.

In case of a filter medium having the above-mentioned three-layer structure, when a dust-containing gas is passed through this filter medium from the front layer to the back layer, since the gas first passes through the coarse portion and then flows into the denser portion, no clogging is caused, which is in contrast to the conventional filter media wherein clogging is readily caused by dust particles caught in the surface portion where filtration is mainly performed. Namely, not only the surface portion but also the interior portion exerts a dust-collecting function, and the amount of dusts collected is further increased and the life is further prolonged.

In case of a filter medium having the surface covered with the above-mentioned irregular and very fine depressions, the area of the surface effective for filtration is markedly increased and the amount of dusts collected is extremely increased, and the life is further prolonged.

In order to enhance the strength of the filter medium of the present invention, it is preferred that the filter medium be bonded to a coarse fabric during or after the preparation.

In the examples, the physical properties of a filter medium were determined as follows.

Tensile strength (kg/in), elongation (%) and burst strength ($kg/cm^2$) were determined according to Japanese Industrial Standard L-1096.

Water resistance was expressed in terms of the tensile strength retention ratio (%) as measured after the filter medium was immersed in water for 60 minutes.

Heat resistance was expressed in terms of the tensile strength retention ratio (%) as measured after the filter medium was heat-treated at 120° C. for 60 minutes under dry heat conditions.

Folding strength was expressed in terms of the tensile strength retention ratio (%) as measured after the filter medium was doubled and then roller-pressed at a pressure of 3 $kg/cm^2$.

Combustion residue was expressed in the ratio (%) of (a) the weight of the combustion residue as measured after combustion at 800° C. in an electric furnace, to (b) the original weight.

Time required for reaching 50 mm $H_2O$ means the time period for which the air permeation resistance of the filter medium reaches 50 mm$H_2O$ as measured when stearic acid particles having a particle size of $0.3\mu$ are collected by the filter medium. The air permeation resistance and the dust collecting efficiency of the filter medium were also determined by using such stearic acid particles. Incidentally, the air speed was adjusted to 2.3 cm/sec at the measurement.

The present invention will now be described in detail with reference to the following examples that by no means limit the scope of the invention.

EXAMPLE 1

One to five of polyester fiber webs (having a basis weight of 30 $g/m^2$) composed mainly of fibers having a mean single fiber diameter of 0.08, 0.1, 1, 1.5 or $2\mu$ and prepared by the melt blow spinning method were piled and treated by a pin tenter at 150° C. while keeping the width constant. The obtained fibrous web or webs were placed on a 50-mesh net moving at a speed of 1 m/min and high-pressure water maintained at a pressure of 2 to 30 $kg/cm^2$ (gauge pressure) was jetted to the fibrous web or webs from nozzles located 60 mm above the fibrous web or webs in a vacuum zone. The nozzles were arranged in 6 lines in a zigzag pattern with respect to the advancing direction of the fibrous web or webs at intervals of 5 mm in the transverse direction and intervals of 2 mm in the longitudinal direction. The nozzles had a diameter of 0.15 mm and made a circular movement with a circular movement diameter of 8 mm at a speed of 270 rotations per minute.

The water jet treatment was first conducted on the front side of the fibrous web or webs, then on the back side and finally on the front side. Thus, the water jet treatment was conducted three times in total. Then, the treated fibrous web or webs were dried at 100° C. Incidentally, the fiber packing ratio was adjusted by controlling the jetting pressure of water.

The obtained results are shown in Table I.

TABLE I

| Run No. | Mean Single Fiber Diameter (μ) | Number of Piled Webs | Fiber Packing Ratio (%) | Fiber Surface Area Ratio ($S_B/S_A$) | Number N of Piled Fibers | Dust-Collecting Efficiency (%) | Air Permeation Resistance (mmH$_2$O) |
|---|---|---|---|---|---|---|---|
| 1* | 0.08 | 4 | 14.5 | 0.58 | 1100 | 99.0 | 50< |
| 2 | 0.1 | 1 | 10.9 | 0.71 | 218 | 99.90 | 11.5 |
| 3 | " | 2 | 12.4 | 0.70 | 434 | 99.95 | 16.5 |
| 4 | " | 3 | 9.3 | 0.71 | 651 | 99.95 | 12.5 |
| 5 | " | 4 | 8.7 | 0.72 | 870 | 99.99 | 13.0 |
| 6 | " | " | 4.3 | 0.75 | 870 | 99.90 | 9.5 |
| 7* | " | 5 | 21.7 | 0.62 | 1080 | 99.99 | 50< |
| 8* | 1.0 | 1 | 7.3 | 0.87 | 22 | 95.8 | 5.5 |
| 9 | " | 2 | 7.9 | 0.87 | 43 | 99.90 | 6.0 |
| 10 | " | 3 | 9.1 | 0.86 | 66 | 99.97 | 8.0 |
| 11* | " | 4 | 2.9 | 0.88 | 87 | 98.1 | 3.5 |
| 12 | " | " | 8.9 | 0.90 | 87 | 99.98 | 8.5 |
| 13 | " | " | 16.7 | 0.91 | 87 | 99.99< | 15.5 |
| 14 | " | 5 | 9.0 | 0.82 | 109 | 99.97 | 11.5 |
| 15* | " | " | 20.5 | 0.80 | 109 | 99.99< | 50< |
| 16 | 1.5 | 4 | 8.7 | 0.71 | 58 | 99.91 | 7.0 |
| 17 | " | 5 | 9.0 | 0.75 | 73 | 99.90 | 10.5 |
| 18* | 2.0 | 4 | 22.4 | 0.70 | 43 | 99.1 | 33.5 |
| 19* | " | 4 | 8.7 | 0.76 | 43 | 98.2 | 5.0 |

Note
*: Comparative Examples

The physical properties of the filter medium obtained at Run No. 12 of this Example were compared with those of a commercially available glass fiber filter medium. The obtained results are shown in Table II.

TABLE II

| Physical Properties | Filter Medium of Run No. 12 | Commercially Available Glass Fiber Filter Medium | Remarks |
|---|---|---|---|
| Tensile Strength (kg/in) | 3.36 × 2.05 | 1.10 × 0.85 | — |
| Elongation (%) at Break | 29 × 41 | 3 × 6 | — |
| Water Resistance (strength retention ratio, %) | 100 × 100 | 40 × 40 | Immersed in water for 60 minutes |
| Heat Resistance (strength retention ratio, %) | 100 × 100 | 100 × 100 | 120° C. × 10 minutes |
| Folding Strength (strength retention ratio, %) | 125 × 120 | 69 × 75 | Roll-pressed at 3 kg/cm$^2$ |
| Burst Strength (kg/cm$^2$) | 2.40 | 0.33 | — |
| Combustion Residue (%) | 0.07 | 95.1 | — |
| Time (minutes) Required for Reaching 50 mmH$_2$O | 360 | 200 | — |

EXAMPLE 2

Five kinds of fibrous webs composed of polyamide fibers having a mean single fiber diameter of 0.5μ and having a basis weight of 30, 60, 100, 150 or 200 g/m$^2$ were prepared according to the melt blow spinning method. In these fibrous webs, thick rope-like bundled fibers were observed with an increase of the basis weight and the front layer portion was not uniform. These fibrous webs were independently treated in the same manner as described in Example 1. The physical properties of the obtained filter media are shown in Table III.

TABLE III

| Run No. | Mean Single Fiber Diameter (μ) | Basis Weight (g/m$^2$) | Fiber Packing Ratio (%) | Fiber Surface Area Ratio ($S_B/S_A$) | Number N of Piled Fibers | Dust-Collecting Efficiency (%) | Air Permeation Resistance (mmH$_2$O) | Appearance Observed with Naked Eye (formation of rope-like bundled fibers) |
|---|---|---|---|---|---|---|---|---|
| 20 | 0.5 | 30 | 7.0 | 0.83 | 50 | 99.91 | 5.5 | Not observed |
| 21 | " | 60 | 8.4 | 0.81 | 100 | 99.97 | 9.5 | Not observed |
| 22 | " | 100 | 13.9 | 0.75 | 167 | 99.97 | 14.5 | Thin rope-like bundled fibers |
| 23 | " | " | 7.4 | 0.80 | 167 | 99.90 | 10.0 | |
| 24 | " | 150 | 15.1 | 0.63 | 250 | 99.93 | 19.5 | Thick rope-like bundled fibers |
| 25 | " | " | 9.0 | 0.65 | 250 | 99.90 | 15.5 | |
| 26 | " | " | 7.0 | 0.63 | 250 | 99.90 | 12.5 | |
| 27* | " | 200 | 11.1 | 0.58 | 333 | 95.2 | 28.5 | Many thick rope-like bundled fibers |
| 28* | " | " | 8.3 | 0.59 | 333 | 96.8 | 24.0 | |

Note
*: Comparative Examples

EXAMPLE 3

Five polyester fiber webs (having a basis weight of 30 g/m²) composed mainly of fibers having a mean single fiber diameter of 1.0μ and prepared by the melt blow spinning method were piled to obtain a fibrous web having a basis weight of 150 g/m². The fibrous web was placed on a 50-mesh net moving at a speed of 1 m/min and high-pressure water maintained at a pressure of 2 to 35 kg/cm² (gauge pressure) was jetted to the fibrous web from nozzles located 40 mm above the fibrous web in a vacuum zone. The nozzles were arranged in 6 lines in a zigzag pattern with respect to the advancing direction of the fibrous web at intervals of 5 mm in the transverse direction and intervals of 2 mm in the longitudinal direction. The nozzles had a diameter of 0.20 mm and made a circular movement of a moving diameter of 8 mm at 150 rotations per minute.

The high-pressure water jet treatment was conducted on the front side and back side alternately 5 times as a whole. The fibrous web was dried at 100° C. and heat-set at 150° C. The physical properties of the obtained filter medium were determined in the same manner as described in Example 1. The obtained results are shown in Table IV.

The properties of the filter medium of Run No. 32 of this Example were compared with those of a commercially available glass fiber filter medium. The obtained results are shown in Table V.

TABLE V

| Physical Properties | Filter Medium of Run No. 32 | Commercially Available Glass Fiber Filter Medium | Remarks |
| --- | --- | --- | --- |
| Tensile Strength (kg/in) | 4.01 × 3.13 | 1.10 × 0.85 | — |
| Elongation (%) at Break | 32 × 42 | 3 × 6 | — |
| Water Resistance (strength retention ratio, %) | 100 × 100 | 40 × 40 | Immersed in water for 60 minutes |
| Heat Resistance (strength retention ratio, %) | 100 × 100 | 100 × 100 | 120° C. × 60 minutes |
| Folding Strength (strength retention ratio, %) | 110 × 105 | 69 × 75 | Roll-pressed under 3 kg/cm² |
| Burst Strength (kg/cm²) | 3.15 | 0.33 | — |
| Combustion Residue (%) | 0.07 | 95.1 | — |
| Time (minutes) Required for Reaching 50 mmH₂O | 420 | 200 | — |

EXAMPLE 4

One to five of polyester fiber webs (having a basis weight of 30 g/m²) composed of fibers having a mean fiber diameter of 1.0μ and prepared by the melt blow spinning method were piled to obtain fibrous webs. Each fibrous web was treated by a pin tenter at 130° C. while keeping the width constant. The fibrous web was placed on a 50-mesh net moving at a speed of 1 m/min and high-pressure water maintained at 2 to 3 kg/cm² (gauge pressure) was jetted on the fibrous web from nozzles located 40 mm above the fibrous web in a vacuum zone. An 80-mesh net comprising wires having a diameter of 0.2 mm was arranged between the fibrous web and the nozzles. The nozzles were arranged in 6 lines in a zigzag pattern with respect to the advancing direction of the fibrous web at intervals of 5 mm in the transverse direction and intervals of 2 mm in the longitudinal direction. The nozzles had a diameter of 0.30 mm and made a circular movement of a moving diameter of 8 mm at 250 rotations per minute.

The high-pressure water jet treatment was conducted two times on each of the front and back sides, and the water jet-treated fibrous web was dried at 100° C. The properties of the obtained filter medium were determined in the same manner as in Example 1. The obtained results are shown in Table VI.

TABLE IV

| Run No. | Mean Single Fiber Diameter (μ) | Jet Treatment Water Pressure (kg/cm²) | | | | | Fiber Packing Ratio (%) | Fiber Surface Area Ratio ($S_B/S_A$) | Number N of Piled Fibers | Dust-Collecting Efficieny (%) | Air Permeation Resistance (mmH₂O) | Results of Observation of Section* |
| --- | --- | --- | --- | --- | --- | --- | --- | --- | --- | --- | --- | --- |
| | | First (front side) | Second (back side) | Third (front side) | Fourth (back side) | Fifth (front side) | | | | | | |
| 29 | 1.0 | 10 | 10 | 10 | 10 | 10 | 16.5 | 0.72 | 109 | 99.91 | 15.5 | A |
| 30 | " | 10 | 10 | 5 | 5 | 2 | 11.3 | 0.75 | " | 99.96 | 10.4 | B |
| 31 | " | 20 | 20 | 20 | 20 | 20 | 17.7 | 0.83 | " | 99.90 | 16.3 | A |
| 32 | " | 20 | 20 | 10 | 10 | 5 | 8.1 | 0.83 | " | 99.99 | 9.4 | B |
| 33 | " | 30 | 30 | 15 | 15 | 10 | 15.8 | 0.80 | " | 99.97 | 15.3 | B |
| 34 | " | 30 | 30 | — | — | — | 17.0 | 0.80 | " | 99.91 | 20.5 | A |
| 35 | " | 30 | 30 | 30 | 30 | 30 | 23.5 | 0.84 | " | 98.2 | 50< | A |
| 36 | " | 20 | 20 | 25 | 25 | 30 | 23.0 | 0.81 | " | 98.9 | 50< | A |
| 37 | " | 35 | 35 | — | — | — | 25.0 | 0.74 | " | 95.7 | 50< | Pinholes formed |

Note
*Observation of Section:
A: Depressions were present on the surface but the three-layer structure was not clear
B: Fluffs were present on the surface and a definite three-layer structure was observed

TABLE VI

| Run No. | Mean Single Fiber Diameter ($\mu$) | Number of Piled Webs | Jet Water Pressure (kg/cm$^2$) | Fiber Packing Ratio (%) | Fiber Surface Area Ratio ($S_B/S_A$) | Number of Piled Fibers | Dust-Collecting Efficiency (%) | Air Permeation Resistance (mmH$_2$O) | Appearance*1 |
| --- | --- | --- | --- | --- | --- | --- | --- | --- | --- |
| 38* | 1.0 | 4 | 1 | 2.3 | 0.51 | 87 | 97.2 | 3.5 | Flat surface |
| 39 | 1.0 | 4 | 2 | 4.1 | 0.60 | " | 99.90 | 4.0 | Fine depressions formed |
| 40 | 1.0 | 4 | 5 | 7.5 | 0.70 | " | 99.95 | 6.0 | Fine depressions formed |
| 41 | 1.0 | 4 | 10 | 11.0 | 0.80 | " | 99.98 | 11.5 | Fine depressions formed |
| 42 | 1.0 | 4 | 20 | 13.5 | 0.81 | " | 99.99 | 20.5 | Fined depressions formed |
| 43* | 1.0 | 4 | 30 | 20.2 | 0.85 | " | 98.8 | 45.5 | Pinholes |
| 44* | 1.0 | 4 | 35 | 25.1 | 0.85 | " | 97.1 | 50 | " |
| 45* | 1.0 | 1 | 10 | 21.0 | 0.80 | 22 | 95.0 | 3.5 | " |
| 46 | 1.0 | 3 | 10 | 15.5 | 0.79 | 66 | 99.95 | 15.0 | Fine depressions formed |
| 47 | 1.0 | 5 | 10 | 9.0 | 0.75 | 109 | 99.99 | 9.0 | Fine depressions formed |

Note
*: Comparative Examples
*1: Fine depressions: mean diameter = 0.05–2 mm, mean depth = 0.05–0.5 mm The properties of the filter medium of Run No. 41 of this Example were compared with those of a commercially available glass fiber filter medium. The obtained results are shown in Table VII.

TABLE VII

| Physical Properties | Filter Medium of Run No. 41 | Commercially Available Glass Fiber Filter Medium | Remarks |
| --- | --- | --- | --- |
| Tensile Strength (kg/in) | 3.25 × 2.55 | 1.10 × 0.85 | — |
| Elongation (%) at Break | 30 × 42 | 3 × 6 | — |
| Water Resistance (strength retention ratio, %) | 100 × 100 | 40 × 40 | Immersed in water at 60° C. |
| Heat Resistance (strength retention ratio, %) | 100 × 100 | 100 × 100 | 120° C. × 60 minutes |
| Folding Strength (strength retention ratio, %) | 130 × 120 | 69 × 75 | Roll-pressed under 3 kg/cm$^2$ |
| Burst Strength (kg/cm$^2$) | 2.81 | 0.33 | — |
| Combustion Residue (%) | 0.07 | 95.1 | — |
| Time (minutes) Required for Reaching 50 mmH$_2$O | 410 | 200 | — |

EXAMPLE 5

The same fibrous webs as used in Example 2 were treated in the same manner as described in Example 4 except that the first high-pressure water jet treatment was conducted at a gauge pressure of 10 kg/cm$^2$ directly (the intermediate net was not used) on each of the front and back sides one time and the second treatment was conducted at a gauge pressure of 5 kg/cm$^2$ with dispersed high-pressure water (the intermediate net was used) on each of the front and back sides one time. Many fine depressions were formed on the surface of the obtained filtered medium. The properties of the obtained filter medium are shown in Table VIII.

TABLE VIII

| Run No. | Basis Weight (g/m$^2$) | Fiber Packing Ratio (%) | Fiber Surface Area Ratio ($S_B/S_A$) | Number of Piled Fibers | Dust-Collecting Efficiency (%) | Air Permeation Resistance (mmH$_2$O) | Appearance (Formation of Rope-Like Bundled Filaments) |
| --- | --- | --- | --- | --- | --- | --- | --- |
| 48 | 30 | 7.1 | 0.84 | 50 | 99.90 | 4.5 | Fine depressions not formed |
| 49 | 60 | 9.0 | 0.80 | 100 | 99.91 | 5.5 | Fine depressions not formed |
| 50 | 100 | 11.0 | 0.70 | 167 | 99.94 | 7.0 | Few fine depressions formed |
| 51 | 150 | 13.5 | 0.60 | 250 | 99.90 | 14.0 | Relatively many fine depressions formed |
| 52* | 200 | 15.0 | 0.50 | 333 | 96.1 | 25.0 | Many fine depressions formed |

*Comparative Example

EXAMPLE 6

Two polypropylene fiber webs (having a basis weight of 50 g/m$^2$) composed of fibers having a mean single fiber diameter of 0.8$\mu$ and prepared by the melt blow spinning method were piled to prepare a fibrous web A. Separately, two of the same polypropylene fiber webs were laminated while interposing a web (having a basis weight of 10 g/m²) prepared from polyester fibers having a mean single fiber diameter of 3.2μ and a single fiber length of 10 mm by the paper-manufacturing method to prepare a fibrous web B.

These fibrous webs were subjected to the high-pressure water jet treatment in the same manner as in Run No. 30 of Example 3.

Between the obtained filter media, there was no substantial difference of the dust-collecting efficiency, but the air permeation resistance of the filter medium prepared from the fibrous web B was lower than that of the filter medium prepared from the fibrous web A and prolongation of the life could be expected in the filter medium prepared from the fibrous web B.

We claim:

1. A filter medium comprising one fibrous web or a plurality of piled and integrated fibrous webs, said web or webs being composed mainly of ultra-fine combustible synthetic fibers having a single fiber diameter of from 0.1 to 1.5μ, wherein the constituent fibers are interlaced and entangled with one another in various directions and satisfy the following requirements:

(i) the fiber packing ratio α (%), which is defined by the following formula, is in the range of $20 \geq \alpha \geq 3$:

$$\alpha = \frac{\rho'}{\rho} \times 100$$

wherein $\rho$ stands for the true density of the fibers and $\rho'$ stands for the apparent density of the filter medium, (ii) the ratio $S_B/S_A$ of the actually measured surface area $S_B$ (m²) of the constituent fibers per m² of the filter medium to the total surface area $S_A$ (m²) expressed by the following formula:

$$S_A = \frac{9000\pi\phi W}{d}$$

wherein d stands for the mean single fiber denier, $\phi$ stands for the mean single fiber diameter (m) and W stands for the basis weight (g/m²) of the filter medium, is in the range of $$1 > \frac{S_B}{S_A} \geq 0.6, \text{ and}$$

(iii) the number N of single fibers piled in the thickness direction of the filter medium, which is expressed by the following formula:

$$N = \frac{\alpha l}{100\phi'}$$

wherein α stands for the fiber packing ratio (%), l stands for the thickness (μ) of the filter medium and $\phi'$ stands for the mean single fiber diameter (μ), is in the range of $1000 \geq N \geq 40$ and wherein at least one surface of the filter medium is entirely covered with irregular fine depressions not uniform in shape.

2. A filter medium as set forth in claim 1, wherein the filter medium has a three-layer structure comprising a front layer in which constituent fibers are interlaced and entangled mainly three-dimensionally and which has fine fluffs formed on the surface thereof, an intermediate layer in which the constituent fibers are interlaced and entangled mainly two-dimensionally and a back layer in which the constituent fibers are interlaced and entangled mainly three-dimensionally and which is denser than the front layer.

3. A filter medium as set forth in claim 1, wherein the depressions have a mean diameter of from 0.05 to 2 mm and a mean depth of from 0.05 to 0.5 mm.

4. A filter medium as set forth in claim 1, wherein the web composed mainly of ultra-fine combustible synthetic fibers having a single fiber diameter of 0.1 to 1.5μ is a web of polyester continuous filaments obtained by a melt blow spinning method.

5. A filter medium according to claim 1 comprising one fibrous web.

6. A filter medium according to claim 1 comprising a plurality of piled and integrated fibrous webs.

* * * * *